(12) United States Patent
Taguchi et al.

(10) Patent No.: US 10,361,807 B2
(45) Date of Patent: Jul. 23, 2019

(54) STATION-SIDE DEVICE AND WAVELENGTH CONTROL METHOD

(71) Applicant: NIPPON TELEGRAPH AND TELEPHONE CORPORATION, Tokyo (JP)

(72) Inventors: Katsuhisa Taguchi, Kanagawa (JP); Tomoaki Yoshida, Kanagawa (JP); Kota Asaka, Kanagawa (JP); Shunji Kimura, Kanagawa (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 14 days.

(21) Appl. No.: 15/533,304

(22) PCT Filed: Jan. 6, 2016

(86) PCT No.: PCT/JP2016/050256
§ 371 (c)(1),
(2) Date: Jun. 5, 2017

(87) PCT Pub. No.: WO2016/114199
PCT Pub. Date: Jul. 21, 2016

(65) Prior Publication Data
US 2018/0351685 A1 Dec. 6, 2018

(30) Foreign Application Priority Data
Jan. 16, 2015 (JP) .................................. 2015-006853

(51) Int. Cl.
*H04J 14/02* (2006.01)
*H04L 12/44* (2006.01)
(Continued)

(52) U.S. Cl.
CPC ...... *H04J 14/0246* (2013.01); *H04B 10/0793* (2013.01); *H04B 10/2513* (2013.01);
(Continued)

(58) Field of Classification Search
CPC .................................................. H04J 14/0246
See application file for complete search history.

(56) References Cited

U.S. PATENT DOCUMENTS

| | | | |
|---|---|---|---|
| 8,953,942 B1* | 2/2015 | Lam | H01J 14/0282 398/68 |
| 2003/0071985 A1* | 4/2003 | Mori | G01M 11/332 356/73.1 |

(Continued)

FOREIGN PATENT DOCUMENTS

| | | |
|---|---|---|
| JP | 2008-172351 A | 7/2008 |
| WO | 2007/086514 A1 | 8/2007 |
| WO | 2014/087994 A1 | 6/2014 |

OTHER PUBLICATIONS

Kaneko et al., "First λ-tunable Dynamic Load-Balancing Operation Enhanced by 3-msec Bidirectional Hitless Tuning on Symmetric 40-Gbit/s WDM/TDM-PON", OFC, 2014, San Francisco, CA, Th5A.4, 2014, 3 pages.

(Continued)

*Primary Examiner* — Nathan M Cors
(74) *Attorney, Agent, or Firm* — Ohlandt, Greeley, Ruggiero & Perle, L.L.P.

(57) ABSTRACT

An OLT configures combinations of wavelength pairs used for upstream and downstream signals, in a wavelength multiplexing optical communication system which performs single-core bidirectional transmission of a plurality of upstream and downstream signals, in such a way that the maximum value of the chromatic dispersion delay amount calculated from each wavelength pair is less than the maximum value of the chromatic dispersion delay amounts (Continued)

calculated when the combinations of wavelength pairs used for upstream and downstream signals are both allocated from the short wave side.

10 Claims, 15 Drawing Sheets

(51) Int. Cl.
    *H04B 10/079* (2013.01)
    *H04J 14/08* (2006.01)
    *H04B 10/2513* (2013.01)
    *H04J 3/00* (2006.01)

(52) U.S. Cl.
    CPC .............. *H04J 3/00* (2013.01); *H04J 14/025* (2013.01); *H04J 14/0226* (2013.01); *H04J 14/0256* (2013.01); *H04J 14/0278* (2013.01); *H04J 14/0282* (2013.01); *H04J 14/08* (2013.01); *H04L 12/44* (2013.01); *H04J 2014/0253* (2013.01)

(56) References Cited

U.S. PATENT DOCUMENTS

| | | | |
|---|---|---|---|
| 2004/0141172 A1* | 7/2004 | Davidson | H04B 10/07951 356/73.1 |
| 2008/0166127 A1 | 7/2008 | Kazawa et al. | |
| 2008/0310841 A1* | 12/2008 | Lee | H04B 10/572 398/63 |
| 2009/0016726 A1 | 1/2009 | Suzuki et al. | |
| 2015/0341137 A1 | 11/2015 | Kaneko et al. | |
| 2016/0197697 A1* | 7/2016 | Bonk | H04B 10/27 398/58 |

OTHER PUBLICATIONS

International Search Report dated Feb. 23, 2016 from corresponding International PCT Application No. PCT/JP2016/050256, 2 pages.
International Preliminary Report on Patentability dated Jul. 27, 2017 from corresponding International PCT Application No. PCT/JP2016/050256, 6 pages.

* cited by examiner

| WAVELENGTH PAIR | UPSTREAM WAVELENGTH | DOWNSTREAM WAVELENGTH |
|---|---|---|
| 1 | $\lambda_{u1}$ | $\lambda_{d1}$ |
| 2 | $\lambda_{u2}$ | $\lambda_{d2}$ |
| .... | .... | .... |
| m | $\lambda_{um}$ | $\lambda_{dm}$ |

FIG. 4 (RELATED ART)

| ITEM | NUMERICAL VALUE | UNIT |
|---|---|---|
| TRANSMISSION DISTANCE L | 40 | km |
| UPSTREAM SIGNAL WAVELENGTH BANDWIDTH $B_u$ | 20 | nm |
| UPSTREAM SIGNAL CHROMATIC DISPERSION AMOUNT $D_u$ | 16 | ps/nm/km |
| DOWNSTREAM SIGNAL WAVELENGTH BANDWIDTH $B_d$ | 7 | nm |
| DOWNSTREAM SIGNAL CHROMATIC DISPERSION AMOUNT $D_d$ | 20 | ps/nm/km |

FIG. 5 (RELATED ART)

| WAVELENGTH PAIR | UPSTREAM WAVELENGTH | DOWNSTREAM WAVELENGTH |
|---|---|---|
| 1 | $\lambda_{u1}$ | $\lambda_{dm}$ |
| 2 | $\lambda_{u2}$ | $\lambda_{dm-1}$ |
| .... | .... | .... |
| m | $\lambda_{um}$ | $\lambda_{d1}$ |

FIG. 7

| ITEM | NUMERICAL VALUE | UNIT |
|---|---|---|
| TRANSMISSION DISTANCE L | 40 | km |
| UPSTREAM SIGNAL WAVELENGTH BANDWIDTH $B_u$ | 20 | nm |
| UPSTREAM SIGNAL CHROMATIC DISPERSION AMOUNT $D_u$ | 16 | ps/nm/km |
| DOWNSTREAM SIGNAL WAVELENGTH BANDWIDTH $B_d$ | 7 | nm |
| DOWNSTREAM SIGNAL CHROMATIC DISPERSION AMOUNT $D_d$ | -20 | ps/nm/km |

FIG. 8

| WAVELENGTH PAIR | UPSTREAM WAVELENGTH | DOWNSTREAM WAVELENGTH |
|---|---|---|
| 1 | $\lambda_{um}$ | $\lambda_{d1}$ |
| 2 | $\lambda_{um-1}$ | $\lambda_{d2}$ |
| .... | .... | .... |
| m | $\lambda_{u1}$ | $\lambda_{dm}$ |

FIG. 10

| ITEM | NUMERICAL VALUE | UNIT |
|---|---|---|
| TRANSMISSION DISTANCE L | 40 | km |
| UPSTREAM SIGNAL WAVELENGTH BANDWIDTH $B_u$ | 20 | nm |
| UPSTREAM SIGNAL CHROMATIC DISPERSION AMOUNT $D_u$ | -16 | ps/nm/km |
| DOWNSTREAM SIGNAL WAVELENGTH BANDWIDTH $B_d$ | 7 | nm |
| DOWNSTREAM SIGNAL CHROMATIC DISPERSION AMOUNT $D_d$ | 20 | ps/nm/km |

FIG. 11

STATION-SIDE DEVICE AND WAVELENGTH CONTROL METHOD

BACKGROUND

1. Field of the Disclosure

The present disclosure relates to a station-side device and a wavelength control method.

2. Discussion of the Background Art

In recent years, the introduction of a passive optical network (PON) system as an optical communication system supporting fiber to the home (FTTH) services which are spreading rapidly is being advanced throughout the world. The PON system is an optical communication system that achieves high economic efficiency by one station-side device (optical line terminal: OLT) installed in a connecting station connecting a plurality of subscriber-side devices (optical network units: ONUs) installed in their respective subscriber residences via an optical splitter installed on optical fiber transmission lines and therefore allowing the plurality of subscribers to share the OLT along with an optical transmission line that includes the optical fiber transmission lines and the optical splitter.

At present, mainly, a Gigabit Ethernet (registered trademark)-PON (GE-PON) system having a transmission amount of 1 Gb/s is commercially introduced in Japan. In addition, as next generation optical communication systems that achieve even higher speeds, standardization of 10G-EPON and XG-PON having a 10 Gb/s-class total transmission capacity has been completed, and research and development is being advanced throughout the world. On the background of such increased transmission speed, Next Generation-PON2 (NG-PON2) is being discussed as a successor system of 10 Gb/s-class PON by the Full Service Access Network (FSAN), which is a standardization organization.

In NG-PON2, with the aim of advancing the optical communication network in addition to speeding up from the conventional PON system, study is being made for a WDM/TDM-PON system that is capable of improving connecting efficiency as well as the efficiency of maintenance and administration, and the like by utilizing the wavelength division multiplexing (WDM) in the wavelength axis which makes use of the characteristics of light, in addition to the time division multiplexing (TDM), which is multiplexing in the time axis, which has been employed by the conventional PON system. As for the wavelength allocation of the WDM/TDM-PON which is currently being studied in the standardization, the use of 1524 to 1544 nm in the C-band and 1596 to 1603 nm in the L-band, which are not used in the existing optical communication systems, is being studied in anticipation of coexistence with GE-PON, 10G-EPON, video services, maintenance and administration function wavelength bands, and the like.

FIGS. 1 and 2 show typical configurations of a wavelength-tunable WDM/TDM-PON using a splitter network. FIGS. 1 and 2 show respective cases where the positions of connected ONUs 20 are all the same or different, with an OLT 10 as a reference. In the WDM/TDM-PON, the wavelength-tunable ONUs 20 and the OLT 10 are connected via optical fiber transmission lines 40, 41, 42, and 50 and an optical splitter 30. The OLT 10 is arranged in a connecting building 11. Additionally, a configuration using an optical multiplexer/demultiplexer (arrayed waveguide grating: AWG) or the like instead of the optical splitter 30 is also conceivable.

The ONUs 20 are equipped with wavelength-tunable burst transceivers. The wavelength-tunable burst transceivers are capable of performing wavelength-tunable burst transmitting and receiving operations in which burst signals are transmitted and received in such a way that the wavelengths can be tuned. The OLT 10 achieves the advancement of the optical communication network such as bandwidth fairness controls among users, OLT protection, power saving operations, and the like by effectively using bandwidths in a TDM domain and wavelengths in a WDM domain through a dynamic wavelength and bandwidth allocation (DWBA) function implemented in a media access control (MAC) control unit of the OLT 10. In order to enable these wavelengths of the WDM/TDM-PON system to coexist with existing GE-PON, G-PON, and wavelength bands for videos, as well as 10GE-PON and XG-PON which have completed the standardization, the allocation of 1524 to 1544 nm in C-band to upstream signals and 1596 to 1603 nm in L-band to downstream signals, which are wavelength bands unused in the optical communication system, is being discussed in the standardization.

FIGS. 3 and 4 show an example of wavelength allocation in the wavelength-tunable WDM/TDM-PON system related to the present disclosure. The WDM/TDM-PON system adopts a wavelength pair allocation method that allocates wavelength pairs, which are pairs of wavelengths that perform round trip communication between the OLT and the ONUs 20 with downstream signals from the OLT to the ONUs 20 and upstream signals from the ONUs 20 to the OLT 10. Here, the round trip communication indicates round trip transfer communication in which the OLT transmits a downstream signal, causing the ONUs 20 to transmit upstream signals to the OLT 10.

In the wavelength-tunable WDM/TDM-PON system related to the present disclosure, the upstream signals and the downstream signals are combined as wavelength pairs in order from the short wavelength side with one pair per wavelength, and the wavelength pairs are allocated to the respective ONUs 20. Specifically, as shown in FIG. 3, in a case where the upstream signals and the downstream signals are assumed to be from $\lambda_{u1}$ to $\lambda_{um}$ and from $\lambda_{d1}$ to $\lambda_{dm}$ from the short wavelength side, respectively, the upstream signals and the downstream signals are combined as wavelength pairs one by one in order from the short wavelength side, each of which is then allocated to any of the ONUs 20, as shown in FIG. 4. For example, a wavelength pair 1 is a combination of $\lambda_{u1}$ and $\lambda_{d1}$ where the OLT transmits a signal to the ONU 20 using the wavelength $\lambda_{d1}$, and the ONU 20 transmits a signal to the OLT 10 using the wavelength $\lambda_{u1}$.

Since the upstream wavelength and the downstream wavelength in the WDM/TDM-PON system use the 1.5 μm band with upstream signals and downstream signals having wavelength bandwidths of 20 nm and 7 nm, respectively, there is a risk that the chromatic dispersion delay amounts caused by the chromatic dispersion of the upstream signals and the downstream signals affect the system during long-distance transmission. Here, the chromatic dispersion delay amount D through round trip communication can be calculated by the equation (1).

(Math. 1)

$$D = L \times ((B_u \times D_u) + (B_d \times D_d)) \quad (1)$$

}

Here, the transmission distance is L, the upstream signal wavelength bandwidth is $B_u$, the upstream signal chromatic dispersion amount is $D_u$, the downstream signal wavelength bandwidth is $B_d$, and the downstream signal chromatic dispersion amount is $D_d$. The upstream signal wavelength bandwidth $B_u$ is an absolute value of the difference between a wavelength of a reference signal and a wavelength of a target signal among the upstream signals. The upstream signal chromatic dispersion amount $D_u$ is a coefficient of the variation amount of the chromatic dispersion amount estimated from a range between the wavelength of the reference signal and the wavelength of the target signal. The downstream signal wavelength bandwidth $B_d$ is an absolute value of the difference between a wavelength of a reference signal and a wavelength of a target signal among the downstream signals. The downstream signal chromatic dispersion amount $D_d$ is a coefficient of the variation amount of the chromatic dispersion amount estimated from a range between the wavelength of the reference signal and the wavelength of the target signal.

The chromatic dispersion delay amount D through a round trip is a difference between the dispersion delay amount of a wavelength pair of a reference signal and the dispersion delay amount of a wavelength pair of a target signal when round trip transmission is performed between the OLT and the ONUs 20 using a plurality of wavelength pairs of upstream signals and downstream signals. Here, the chromatic dispersion delay amount D through the round trip is equal to a difference between the delay when round trip transmission is performed using the wavelength pair of the reference signal, and the delay when round trip transmission is performed using the wavelength pair of the target signal. In FIG. 4, a combination of the wavelength of the reference signal among the upstream signals and the wavelength of the reference signal among the downstream signals is the wavelength pair 1.

The equation (2) shows a calculation result of the maximum value of the chromatic dispersion delay amount D through a round trip when the optical communication system uses the wavelength pairs shown in FIGS. 3 and 4. Assuming the signals of the wavelength pair 1 in FIG. 4 as reference signals, the equation (2) calculates the chromatic dispersion delay amount D through a round trip to be generated with the wavelength pair m in FIG. 4. In addition, the equation (2) uses each specification, as shown in FIG. 5, which is being discussed in general NG-PON2. Specifically, L is 40 km, $B_u$ is 20 nm, $D_u$ is 16 ps/nm/km, $B_d$ is 7 nm, and $D_d$ is 20 ps/nm/km.

(Math. 2)
$$D = L \times ((B_u \times D_u) + (B_d \times D_d)) \quad (2)$$
$$= 40 \times ((20 \times 16) + (7 \times 20))$$
$$= 18400 \text{ ps}$$
$$= 18.4 \text{ ns}$$

From the equation (2), the maximum value of the chromatic dispersion delay amount D through a 40 km round trip is 18.4 ns. When the transmission distance is 40 km or more, the maximum value of the chromatic dispersion delay amount D through a round trip becomes an even larger value since the value of L affects the terms in front. Here, given that the recommended value for laser Ton and Toff time in ITU-T standardized G-PON and XG-PON is 32 bits (12.8 nsec) or less, and furthermore, the demand for synchronization functions and the like has increased in recent years, it is conceivable that there will be ever stricter demands against delays in the system.

In addition, amid broadening of areas having the transmission distance of 40 km or more actively being studied in these WDM/TDM-PON systems, there is a significant risk that the effect of chromatic dispersion in long-distance transmission may generate the amount of delay that exceeds the laser rise and fall allowable time in existing G-PON and the like, and this may possibly become a significant problem for the systems and applications.

CITATION LIST

Non Patent Literature

Non Patent Literature 1: S. Kaneko, T. Yoshida, S. Furusawa, M. Sarashina, H. Tamai, A. Suzuki, T. Mukojima, S. Kimura, and N. Yoshimoto, "First λ-tunable dynamic load balancing operation enhanced by 3-msec bidirectional hitless tuning on symmetric 40-Gbit/s WDM/TDM-PON" in proc. OFC'2014, San Francisco Calif., Th5A.4, 2014.

SUMMARY

To solve the above-described problems, an object of the present disclosure is to provide a station-side device that reduces differences in the amounts of delays that are generated in upstream signals and downstream signals when performing round trip communication in an optical communication system using the WDM/TDM-PON.

To achieve the object above, a station-side device according to the present disclosure configures combinations of wavelength pairs used for upstream and downstream signals, in a wavelength multiplexing optical communication system which performs single-core bidirectional transmission of a plurality of upstream and downstream signals, in such a way that the maximum value of the chromatic dispersion delay amount calculated from each wavelength pair is less than the maximum value of the chromatic dispersion delay amounts calculated when the combinations of wavelength pairs used for upstream and downstream signals are both allocated from the short wave side.

Specifically, a station-side device according to the present disclosure is in use for an optical communication system through which the station-side device and a plurality of subscriber-side devices connected via an optical transmission line perform, using a wavelength division multiplexing, transmission of downstream signals from the station-side device to the subscriber-side devices and transmission of upstream signals from the subscriber-side devices to the station-side device, wherein the transmission of the upstream signals and the transmission of the downstream signals are performed using wavelength pairs in which wavelengths of the upstream signals and wavelengths of the downstream signals are paired for the respective subscriber-side devices, and as for the wavelength pairs, a maximum value of chromatic dispersion delay amounts which are calculated from the respective wavelength pairs is less than a maximum value of chromatic dispersion delay amounts which are calculated when the wavelengths of the upstream signals and the wavelengths of the downstream signals are allocated in order from a short wavelength side.

In the station-side device according to the present disclosure, the wavelength pairs of the respective subscriber-side devices may be allocated the wavelengths of the upstream signals in order from the short wavelength side and allocated the wavelengths of the downstream signals in order from the long wavelength side, or may be allocated the wavelengths of the upstream signals in order from the long wavelength side and allocated the wavelengths of the downstream signals in order from the short wavelength side.

In the station-side device according to the present disclosure, in a case where a chromatic dispersion delay amount of the wavelength pair allocated to any of the subscriber-side devices among the plurality of subscriber-side devices, the chromatic dispersion delay amount being calculated using estimated chromatic dispersion amounts to be generated in the wavelength of the upstream signal and the wavelength of the downstream signal in the optical transmission line, exceeds a predetermined threshold value, the wavelength pair allocated to the subscriber-side device may be changed.

In the station-side device according to the present disclosure, in a case where a chromatic dispersion delay amount of the wavelength pair allocated to any of the subscriber-side devices among the plurality of subscriber-side devices, the chromatic dispersion delay amount being calculated using estimated chromatic dispersion amounts to be generated in the wavelength of the upstream signal and the wavelength of the downstream signal in the optical transmission line, exceeds a predetermined threshold value, all of the wavelength pairs allocated to the plurality of subscriber-side devices may be changed.

In the station-side device according to the present disclosure, in a case where two or more chromatic dispersion delay amounts of the wavelength pairs allocated to two or more subscriber-side devices among the plurality of subscriber-side devices, the chromatic dispersion delay amounts being calculated using estimated chromatic dispersion amounts to be generated in the wavelengths of the upstream signals and the wavelengths of the downstream signals in the optical transmission line, exceed a predetermined threshold value, the wavelength pairs whose chromatic dispersion delay amounts exceed the threshold value may be allocated to the other subscriber-side devices whose chromatic dispersion delay amounts exceed the threshold value.

Specifically, a wavelength control method according to the present disclosure is a wavelength control method of a station-side device in use for an optical communication system through which the station-side device and a plurality of subscriber-side devices connected via an optical transmission line perform, using a wavelength division multiplexing, transmission of downstream signals from the station-side device to the subscriber-side devices and transmission of upstream signals from the subscriber-side devices to the station-side device, wherein the transmission of the upstream signals and the transmission of the downstream signals are performed using wavelength pairs in which wavelengths of the upstream signals and wavelengths of the downstream signals are paired for the respective subscriber-side devices, and as for the wavelength pairs, a maximum value of chromatic dispersion delay amounts which are calculated from the respective wavelength pairs is less than a maximum value of chromatic dispersion delay amounts which are calculated when the wavelengths of the upstream signals and the wavelengths of the downstream signals are allocated in order from a short wavelength side.

In the wavelength control method according to the present disclosure, in case of a distance between the station-side device and the subscriber-side devices whose chromatic dispersion delay amount exceeds a predetermined threshold value, the wavelength pairs allocated to the subscriber-side devices may be changed.

It is to be noted that each of the disclosures above can be combined wherever possible.

Advantageous Effects of Disclosure

According to the present disclosure, the present disclosure can provide a station-side device that reduces differences in the amounts of delays that are generated in upstream signals and downstream signals when round trip communication is performed in an optical communication system using the WDM/TDM-PON.

BRIEF DESCRIPTION OF THE DRAWINGS

FIG. 4 shows an example of wavelength pairs of the wavelengths of the upstream signals and the wavelengths of the downstream signals in the wavelength multiplexing optical communication system related to the present disclosure.

FIG. 5 shows an example of conditions for calculating a chromatic dispersion delay amount through a round trip in the wavelength multiplexing optical communication system related to the present disclosure.

FIG. 7 shows an example of wavelength pairs of the wavelengths of the upstream signals and the wavelengths of the downstream signals in the wavelength multiplexing optical communication system according to the first embodiment of the present disclosure.

FIG. 8 shows an example of conditions for calculating a chromatic dispersion delay amount through a round trip according to the first embodiment of the present disclosure.

FIG. 10 shows an example of wavelength pairs of the wavelengths of the upstream signals and the wavelengths of the downstream signals in the wavelength multiplexing optical communication system according to the second embodiment of the present disclosure.

FIG. 11 shows an example of conditions for calculating a chromatic dispersion delay amount through a round trip according to the second embodiment of the present disclosure.

DETAILED DESCRIPTION OF THE PREFERRED EMBODIMENT

Hereinafter, embodiments of the present disclosure will be described in detail with reference to the drawings. It is to be noted that the present disclosure is not limited to the embodiments described below. These embodiments are for exemplification only, and the present disclosure can be implemented in modes with various changes and modifications based on the knowledge of those skilled in the art. It is to be noted that in this specification and the drawings, the constituent elements with the same reference sign mutually denote the same constituent element.

First Embodiment

Figure 1:
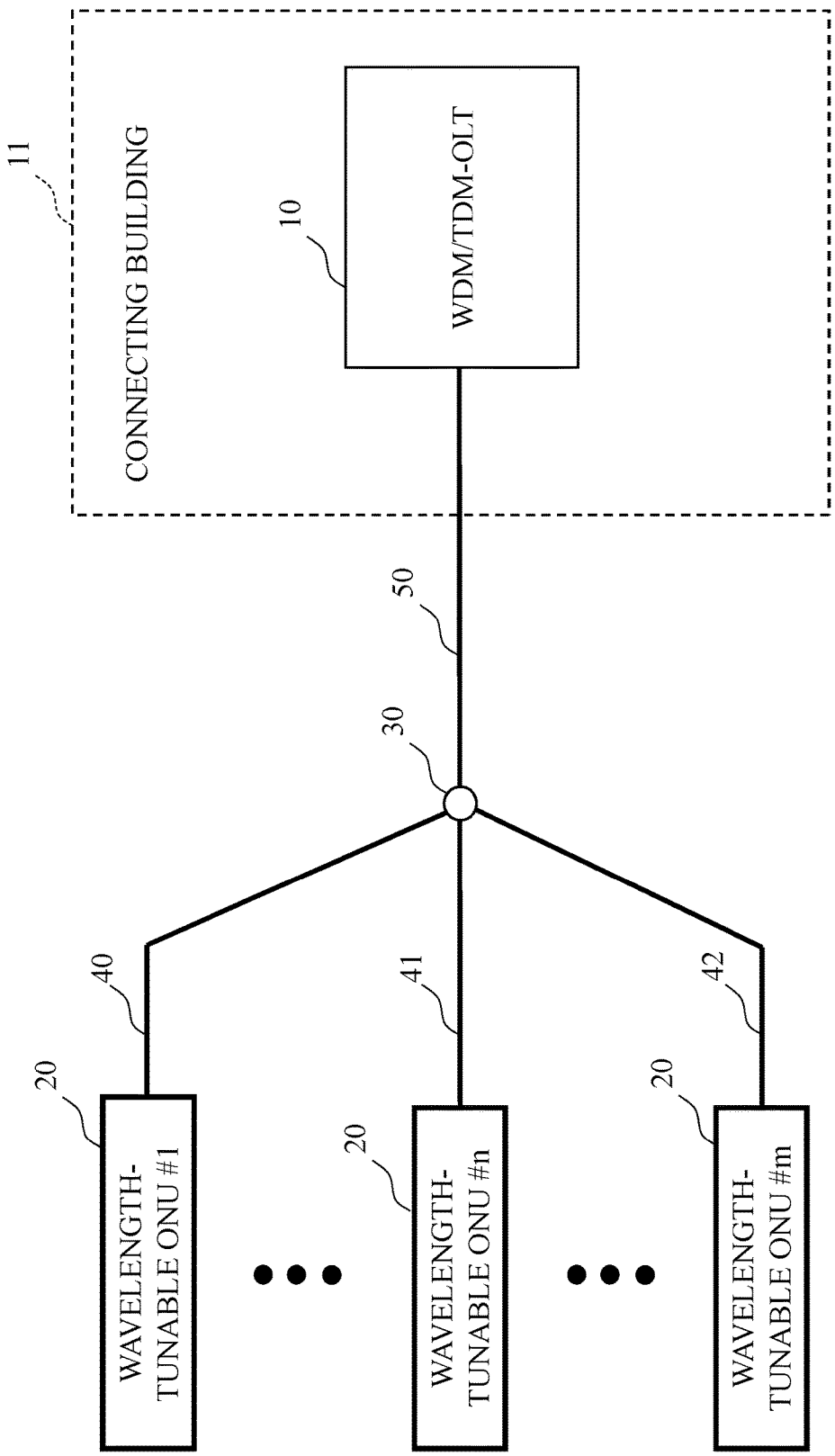
FIG. 1 shows a first example of a wavelength multiplexing optical communication system related to the present disclosure.
Figure 2:
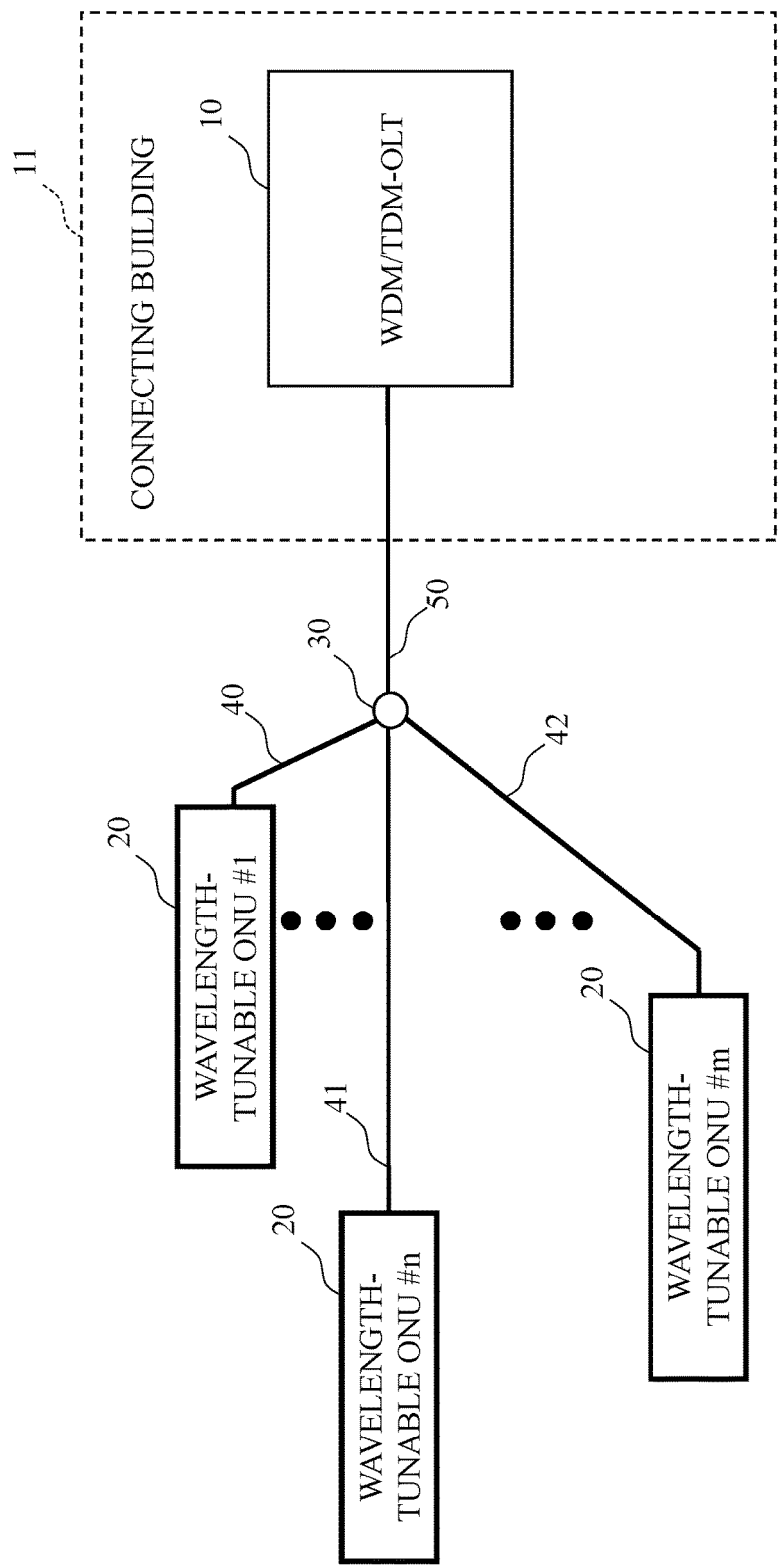
FIG. 2 shows a second example of the wavelength multiplexing optical communication system related to the present disclosure.

As shown in FIGS. 1 and 2, an optical communication system according to the present embodiment is equipped with an OLT 10, ONUs 20, and an optical transmission line. The optical transmission line is equipped with optical fiber transmission lines 40, 41, 42, and 50 and an optical splitter 30. The optical splitter 30 may function as a wavelength mux (WM) that multiplexes and demultiplexes light.

The OLT allocates a wavelength pair performing round trip communication to each ONU 20. At this time, the OLT allocates wavelengths of upstream signals and downstream signals so as to mitigate chromatic dispersion delay amounts D through round trips in the communication between the OLT 10 and the ONUs 20. The OLT and each ONU 20 perform round trip communication in accordance with this wavelength pair allocation.

In round trip communication, for example, the OLT transmits a downstream signal to each ONU 20 in accordance with the wavelength pair allocation. Each ONU 20 sets transmission and reception wavelengths in a wavelength-tunable burst transceiver in accordance with the wavelength pair allocation, receives the downstream signal from the OLT 10, and transmits an upstream signal to the OLT 10. The OLT receives the upstream signals from the respective ONUs 20 in accordance with the wavelength pair allocation. Here, a constituent part of each port in the OLT 10 and an optical subscriber unit (OSU) may function as a channel termination (CT).

Figure 6:
FIG. 6 shows an example of wavelengths of upstream signals and wavelengths of downstream signals in a wavelength multiplexing optical communication system according to a first embodiment of the present disclosure.

FIGS. 6 and 7 show an example of wavelength pairs according to the present embodiment. The present embodiment mitigates the dispersion delay amount that is generated in each wavelength pair due to the effect of the chromatic dispersion in the upstream and downstream signal wavelength bands described using FIG. 5 and equation (2) when the optical communication system using the WDM/TDM-PON performs round trip communication. Here, the WDM/TDM-PON according to the present embodiment is used synonymously with time and wavelength division multiplexing (TWDM)-PON. It is to be noted that although the upstream and downstream signals are composed of an arbitrary number of wavelengths m, this technique is effective when the number of upstream and downstream wavelengths is different. In addition, with regard to wavelength intervals of the upstream and downstream signals, this technique is effective not only when the wavelength intervals are the same, but also when the wavelength intervals are different. As shown in FIG. 6, in the present embodiment, the upstream and downstream signals are composed of m signals arranged at even wavelength intervals as with FIG. 3, and numerals are allocated from the short wavelength side as shown in FIG. 6.

In the optical communication system related to the present disclosure, as shown in FIG. 4, both upstream and downstream signals are combined as wavelength pairs so as to have progressively longer wavelengths from the respective reference signals. However, in the present embodiment, as shown in FIG. 7, the upstream signals are combined from the short wavelength side and the downstream signals from the long wavelength side as wavelength pairs. Accordingly, each wavelength pair is configured as shown in the table in FIG. 7.

The equation (3) shows a calculation result of the maximum value of the chromatic dispersion delay amounts D through round trips with the wavelength pairs shown in FIG. 7. In the equation (3), the chromatic dispersion delay amount D through a round trip to be generated with a wavelength pair m in FIG. 7 is calculated, assuming signals of a wavelength pair 1 in FIG. 7 as the reference signals. In addition, the values shown in FIG. 8 are used in the calculation of the equation (3).

(Math. 3)

$$\begin{aligned} D &= L \times ((B_u \times D_u) + (B_d \times D_d)) \\ &= 40 \times ((20 \times 16) + (7 \times -20)) \\ &= 7200 \text{ ps} \\ &= 7.2 \text{ ns} \end{aligned} \quad (3)$$

Of the dispersion delay amounts in the wavelength pairs in the present embodiment, a downstream signal chromatic dispersion amount $D_d$ whose downstream signals are allocated to wavelength pairs from the long wavelength side defines a chromatic dispersion amount with respect to $\lambda_{d1}$ allocated to the wavelength pair m, which is a signal located on 7 nm shorter wavelength side, relative to $\lambda_{dm}$ allocated to the wavelength pair 1 as a reference shown in FIG. 7, which is the reference signal on the long wavelength side, and therefore, the downstream signal chromatic dispersion amount $D_d$ takes a negative value. Accordingly, the chromatic dispersion delay amount D through the round trip of the transmission distance L=40 km under the conditions shown in FIG. 8 is 7.2 ns, as shown in the equation (3). Here, the chromatic dispersion delay amount D through a round trip in case of using the wavelength pair according to the optical communication system related to the present disclosure, which is calculated using the conditions shown in FIG. 5, is 18.4 ns. Therefore, in the present embodiment, the chromatic dispersion delay amount D through the round trip can be mitigated by 11.2 ns, compared with the case where the conditions shown in FIG. 5 are used.

Although the present embodiment has discussed, as an example, the upstream and downstream signal wavelengths of NG-PON2 that are being discussed by FSAN/ITU-T as an example, the present embodiment is effective for all the optical communication wavelength bands and any frequency intervals of the upstream and downstream signals. In addition, the present embodiment is also effective for 40 km or longer distances. Just by changing the combinations of the wavelength pairs, the present embodiment can mitigate the chromatic dispersion delay amounts D through round trips when the optical communication system performs round trip communication.

In the wavelength multiplexing optical communication system shown in FIG. 2, all the ONUs 20 are connected in different positions. In the present embodiment, however, only part of the ONUs 20 may be connected in different positions, or the ONUs 20 may be connected in two or more positions and an arbitrary number of ONUs 20 may be connected in respective positions. In addition, although the wavelength pair 1 serves as a combination of the wavelength of the reference signal in the upstream signals and the wavelength of the reference signal in the downstream signals in the present embodiment, another wavelength pair may serve as a combination of the wavelengths of the reference signals.

Second Embodiment

Figure 9:
FIG. 9 shows an example of wavelengths of upstream signals and wavelengths of downstream signals in a wavelength multiplexing optical communication system according to a second embodiment of the present disclosure.

FIGS. 9 and 10 show an example of wavelength pairs according to the present embodiment. As in the first embodiment, when performing round trip communication, the present embodiment also mitigates the dispersion delay amount that is generated in each wavelength pair due to the effect of the chromatic dispersion in the upstream and downstream signal wavelength bands described using FIG. 5 and equation (2). It is to be noted that although the upstream and downstream signals are composed of an arbitrary number of wavelengths m, the present embodiment is effective even when the number of upstream and downstream wavelengths is different. In addition, with regard to wavelength intervals of the upstream and downstream signals, the present embodiment is effective not only when the wavelength intervals are the same, but also when the wavelength intervals are different.

Figure 3:
FIG. 3 shows an example of wavelengths of upstream signals and wavelengths of downstream signals in the wavelength multiplexing optical communication system related to the present disclosure.

As shown in FIG. 9, the upstream and downstream signals are composed of m signals arranged at even wavelength intervals as with FIG. 3, and numerals are allocated from the short wavelength side as shown in the figure. In the wavelength pair allocation related to the present disclosure, as shown in FIG. 4, the upstream signals and downstream signals are combined as wavelength pairs so as to have progressively longer wavelengths from the wavelength of each of the reference signals, while the present embodiment is characterized in that as shown in FIG. 10, the upstream signals are combined from the long wavelength side and the downstream signals from the short wavelength side as respective wavelength pairs.

Equation (4) shows a calculation result of the maximum value of the chromatic dispersion delay amounts D through round trips shown in FIG. 10. The values shown in FIG. 11 are used in the calculation of the equation (4).

(Math. 4)

$$D = L \times ((B_u \times D_u) + (B_d \times D_d)) \quad (4)$$
$$= 40 \times ((20 \times -16) + (7 \times 20))$$
$$= -7200 \text{ ps}$$
$$= -7.2 \text{ ns}$$

When considering the maximum value of the chromatic dispersion delay amounts D through round trips in the present embodiment using the equation (4), an upstream signal chromatic dispersion amount $D_u$ whose upstream signals are allocated to wavelength pairs from the long wavelength side defines a chromatic dispersion amount with respect to $\lambda_{u1}$ allocated to a wavelength pair m, which is a signal located on 20 nm shorter wavelength side, relative to $\lambda_{um}$ allocated to a wavelength pair 1 as a reference shown in FIG. 10, which is the reference signal on the long wavelength side, and therefore, the upstream signal chromatic dispersion amount $D_u$ takes a negative value.

Therefore, the chromatic dispersion delay amount D through the round trip calculated by the equation (4) using the conditions in FIG. 11 is −7.2 ns, and thus it is possible to mitigate by 25.6 ns compared with the dispersion delay amount of 18.4 ns in case of using the wavelength pairs according to the optical communication system related to the present disclosure shown in FIG. 5.

Although the present embodiment has discussed, as an example, the upstream and downstream signal wavelengths of NG-PON2 that are being discussed by FSAN/ITU-T as an example, the present embodiment is effective for all the optical communication wavelength bands and any frequency intervals of the upstream and downstream signals. In addition, the present embodiment is also effective for 40 km or longer distances. Just by changing the combinations of the wavelengths used for the wavelength pairs, the present embodiment can mitigate the chromatic dispersion delay amounts D through round trips when the WDM/TDM-PON system performs round trip communication.

Third Embodiment

Figure 12:
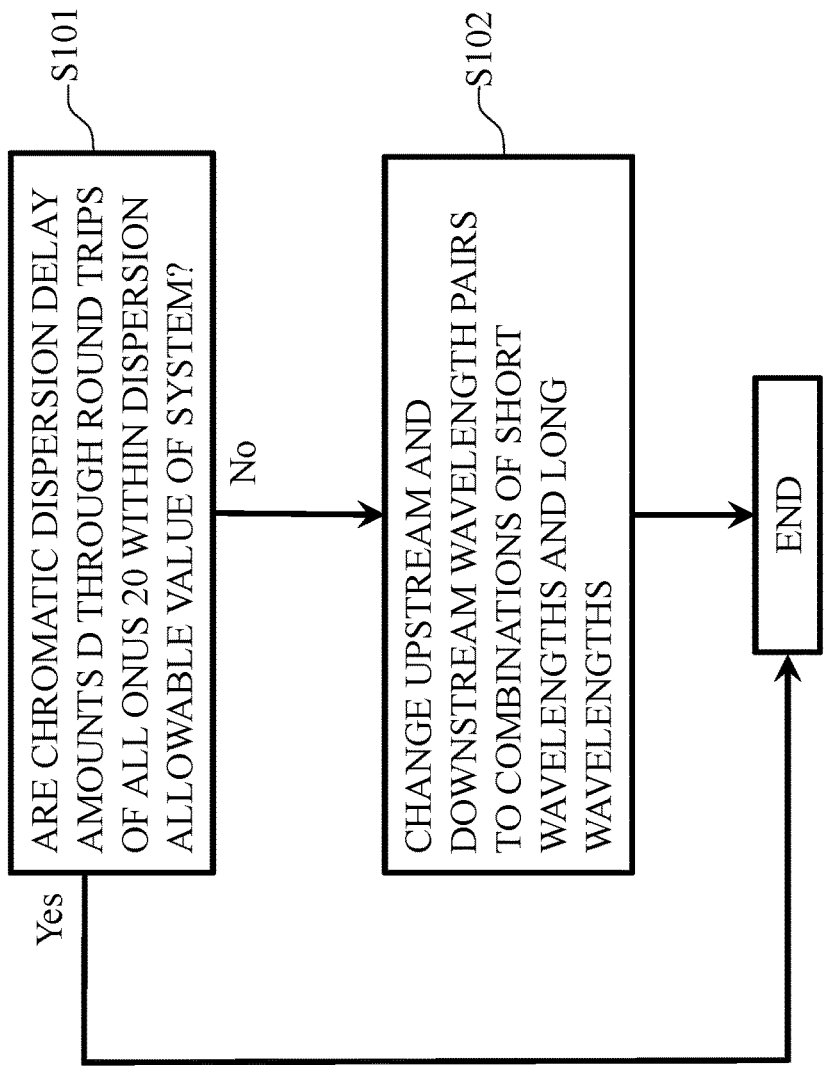
FIG. 12 shows an example of a wavelength pair changing flow in a wavelength multiplexing optical communication system according to a third embodiment of the present disclosure.

FIG. 12 shows a flowchart for changing wavelength pairs in the WDM/TDM-PON in which all the ONUs 20 are connected at the same distance as shown in FIG. 1. In the present embodiment, the OLT changes all the wavelength pairs allocated to the ONUs 20 when finding a chromatic dispersion delay amount D through a round trip that exceeds a threshold value determined as a dispersion allowable value of the system. In the present embodiment, as a premise, the default wavelength pairs of the upstream and downstream signals of the WDM/TDM-PON are combined from the short wavelength side, as shown in FIG. 4.

The wavelengths used in the upstream signals and the downstream signals, the chromatic dispersion amounts $D_u$ and $D_d$, and the wavelength bandwidths $B_u$ and $B_d$ can be grasped in advance. Therefore, if the connecting positions of all the ONUs 20, that is, the transmission distances L, can be grasped, the chromatic dispersion delay amounts D through round trips in the entire optical communication system can be uniquely calculated using the equations (1) to (4).

An access system represented by the PON system is equipped with ranging functions in order to grasp the connecting positions of the ONUs 20. In the present embodiment, therefore, a change of wavelength pairs is determined by deriving the chromatic dispersion delay amounts D through round trips between the OLT and each ONU 20 on the basis of the connecting position information of all the ONUs 20 identified by these ranging functions, and comparing them with the predetermined dispersion allowable value of the system (for example, 12.8 nsec which is Ton/Toff time specified by G-PON).

In the flow shown in FIG. 12, at step S101, in a case where the chromatic dispersion delay amounts D through the round trips calculated using the transmission distance L of each ONU 20 derived from the ranging are within the dispersion allowable value of the system, the wavelength pairs are not changed. On the other hand, at step S101, in a case where the chromatic dispersion delay amount D through a round trip of at least one ONU 20 exceeds the dispersion allowable value of the system (for example, 12.8 nsec which is Ton/Toff time specified by G-PON), the process proceeds to step S102. At step S102, the wavelength pairs are changed as in the first embodiment or the second embodiment. Just by changing the combinations of the wavelength pairs, the present embodiment can mitigate the chromatic dispersion delay amounts D through round trips when the WDM/TDM-PON performs round trip communication.

In the physical handling of chromatic dispersion in the present embodiment, an optical signal is made up of a plurality of waves of light (light waves) overlaying one another. In a situation where such an optical signal propagates through an optical fiber, a propagation constant of each light wave varies according to the frequency of the light wave. Such physical phenomenon in which the propagation constant changes according to the frequency is called dispersion.

In general single-mode optical fibers, there are mainly two kinds of dispersion factors called 1) material dispersion and 2) waveguide dispersion. These dispersions affect the broadening of optical pulse during the transmission of an optical signal, and limit the transmission distance and the transmission speed.

Here, the material dispersion amount $D_m$ caused by the material dispersion is given by the following equation.

[Math. 5]

$$D_m = \frac{d\tau}{d\lambda} = -\frac{\lambda}{c} \frac{d^2 n}{d\lambda^2} \quad (5)$$

$d\tau$ is the broadening of the pulse, $\lambda$ is an optical signal wavelength, and c is the frequency of the optical signal. In addition, $D_m$ is expressed in units of ps/km/nm, indicating the broadening of the spectral when an optical signal having a spectral width of 1 nm is transmitted 1 km.

By contrast, waveguide dispersion is dispersion having influence since different refractive indexes of the core portion and the cladding portion of an optical fiber cause the propagation constant to change depending on the frequency. The waveguide dispersion amount $D_w$ caused by the waveguide dispersion is given by the following equation.

[Math. 6]

$$D_w = -\frac{v n_2 \Delta}{\lambda c} \frac{d^2(vb)}{dv^2} \quad (6)$$

v is a normalized frequency, and $\Delta$ is a refractive index ratio of the core and the cladding. The dispersion amount D of a general single-mode fiber is defined by the sum ($D=D_m+D_w$) of these material dispersion amount $D_m$ and waveguide dispersion amount D. This dispersion amount D is $D_u$ and $D_d$ in the equation (1).

It is known that the dispersion amount D of a general single-mode fiber becomes zero when an optical signal wavelength $\lambda$ is in the vicinity of 1300 nm. In the vicinity of 1550 nm which is the low loss wavelength band in the optical fiber, the dispersion amount D of about 17 ps/km/nm is added to an optical signal each time the optical signal is transmitted 1 km. This means that the optical pulse is broaden by 17 ps each time the optical signal is transmitted 1 km.

Figure 15:
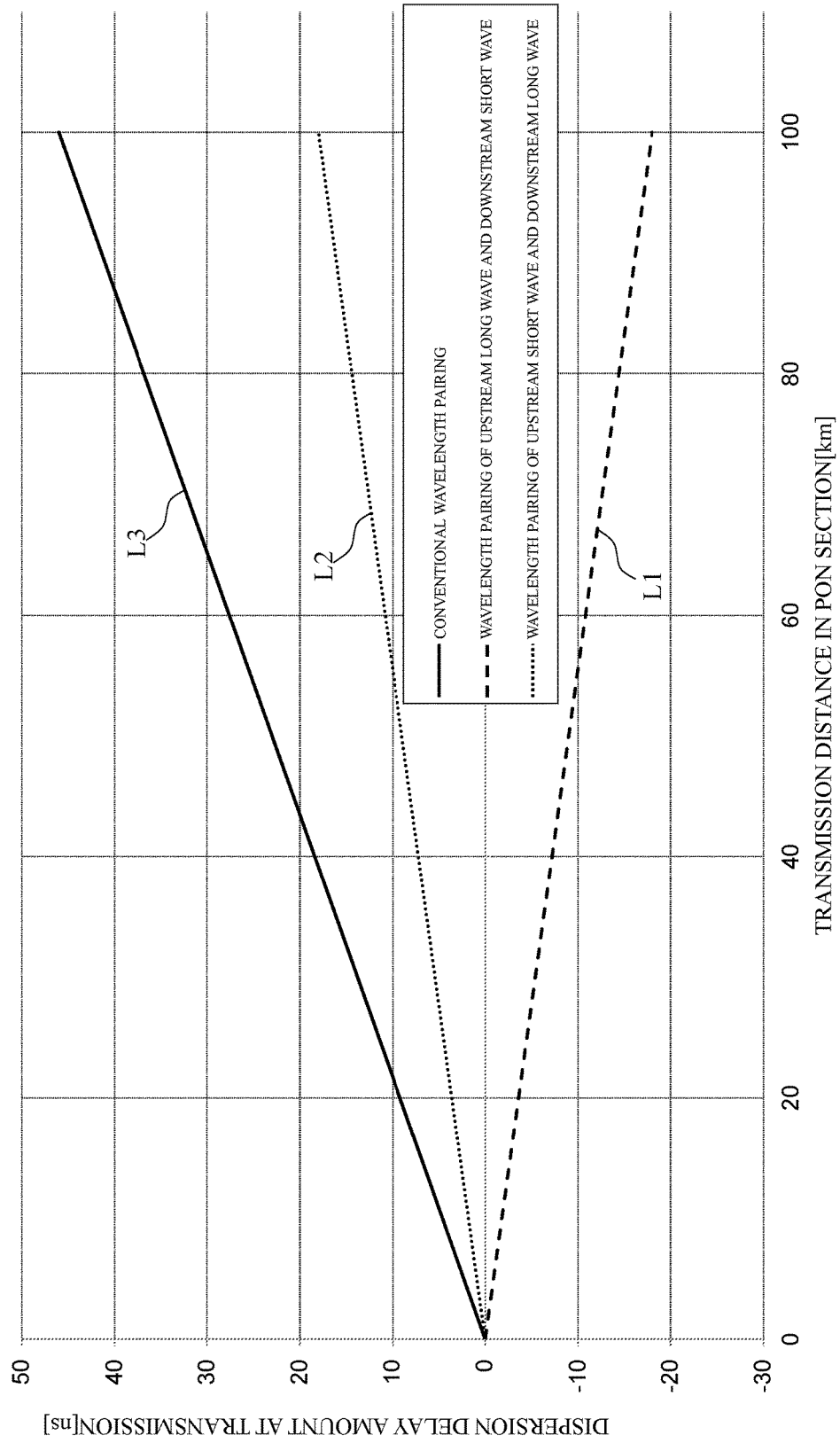
FIG. 15 shows an example of the distance dependency of dispersion delay amounts according to combinations of wavelength pairings according to the present embodiment.

As for the threshold value for switching the wavelength pairs, FIG. 15 shows the distance dependency characteristics of the dispersion delay amounts according to the combinations of wavelength pairings. L1 shows the first embodiment, L2 shows the second embodiment, and L3 shows the case where the wavelength pair shown in FIG. 4 is used. In the first embodiment, the upstream wavelength increases progressively from the reference signal, while the downstream wavelength decreases progressively from the reference signal. In addition, in the second embodiment, the upstream wavelength decreases progressively from the reference signal, while the downstream wavelength increases progressively from the reference signal. In the first embodiment and the second embodiment, therefore, with the equations (5) and (6), the dispersion amount D in the upstream signal and the dispersion amount D in the downstream signal cancel out each other between the upstream signal and the downstream signal. As a result, the dispersion delay amounts of L1 and L2 are less than that of L3.

In the method according to the related art in which communication is performed using wavelengths in which both upstream and downstream wavelengths are paired from the short wavelength side, the dispersion delay amount between a wavelength pair on the shortest wave side and a wavelength pair on the longest wave side at the time of 40 km transmission is 18.2 ns. These dispersion delay amounts increase in proportion to the distance, and in consideration of further broadening of areas which is a trend of access systems in recent years, a dispersion delay amount of 46 ns is generated at the time of, for example, 100 km transmission.

In the physical specification of NG-PON2 standardized in G.989.2, for example, the Ton time allocated to the laser rise of an ONU transmitter is 12.8 ns. At the time of 40 km transmission, therefore, these dispersion delay amounts exceeding Ton are generated with the configuration of the wavelength pairs according to the related art. For example, when switching the wavelengths, these dispersion delay amounts generate a communication impossible time, consuming the bandwidth.

By contrast, with the wavelength pairing configuration according to the present embodiment, the dispersion delay amount at the time of 40 km transmission can be suppressed to 7.2 ns. As for the change from the wavelength pairs according to the related art to the wavelength pairs according to the present embodiment, when the ONU connecting distance information based on the ranging of the OLT and the distance dependency characteristics of the dispersion delay amount are compared in the OLT, according to which the threshold value for wavelength pairing changes is exceeded, such change is made. For example, the threshold value for wavelength pairing changes is set to 12.8 ns or the like, which is the Ton specification of a laser mounted in the ONUs.

Fourth Embodiment

Figure 13:
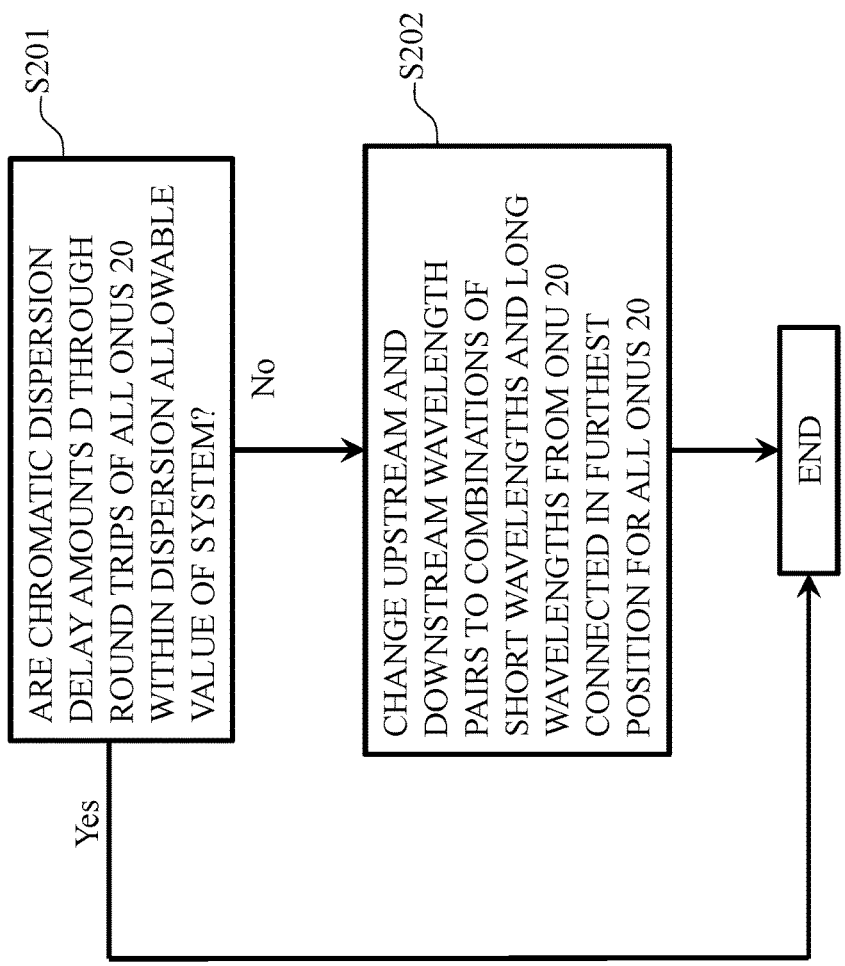
FIG. 13 shows an example of a wavelength pair changing flow in a wavelength multiplexing optical communication system according to a fourth embodiment of the present disclosure.

FIG. 13 shows a flowchart for changing wavelength pairs depending on the chromatic dispersion delay amounts D through round trips in the WDM/TDM-PON in which all the ONUs 20 are connected in different positions as shown in FIG. 2. In the present embodiment, as a premise, the default wavelength pairs of the upstream and downstream signals of the WDM/TDM-PON are also combined from the short wavelength side, as shown in FIG. 4.

In the present embodiment, if the connecting positions of all the ONUs 20, that is, the transmission distances L, can be grasped, the chromatic dispersion delay amounts D through round trips in all the ONUs 20 can also be uniquely calculated, as in the third embodiment. As in the third embodiment, the present embodiment also utilizes the ranging functions in the PON system. Therefore, in the present embodiment, a change of wavelength pairs is determined by deriving the chromatic dispersion delay amounts D through round trips of respective ONUs 20 on the basis of the connecting position information of the ONUs 20 identified by these ranging functions, and then comparing them with the predetermined dispersion allowable value of the system.

In the flow shown in FIG. 13, at step S201, in a case where the chromatic dispersion delay amounts D through round trips of all the ONUs 20, which have been derived from the ranging, are within the dispersion allowable value of the system, the wavelength pairs are not changed. On the other hand, at step S201, in a case where the chromatic dispersion delay amount D through a round trip of any one of the ONUs 20 connected in different positions exceeds the dispersion allowable value of the system, the wavelength pairs of all the ONUs 20 are changed as in the first embodiment or the second embodiment at step S202. Just by changing the combinations of the wavelength pairs, the present embodiment can mitigate the chromatic dispersion delay amounts D through round trips when the WDM/TDM-PON performs round trip communication.

Fifth Embodiment

Figure 14:
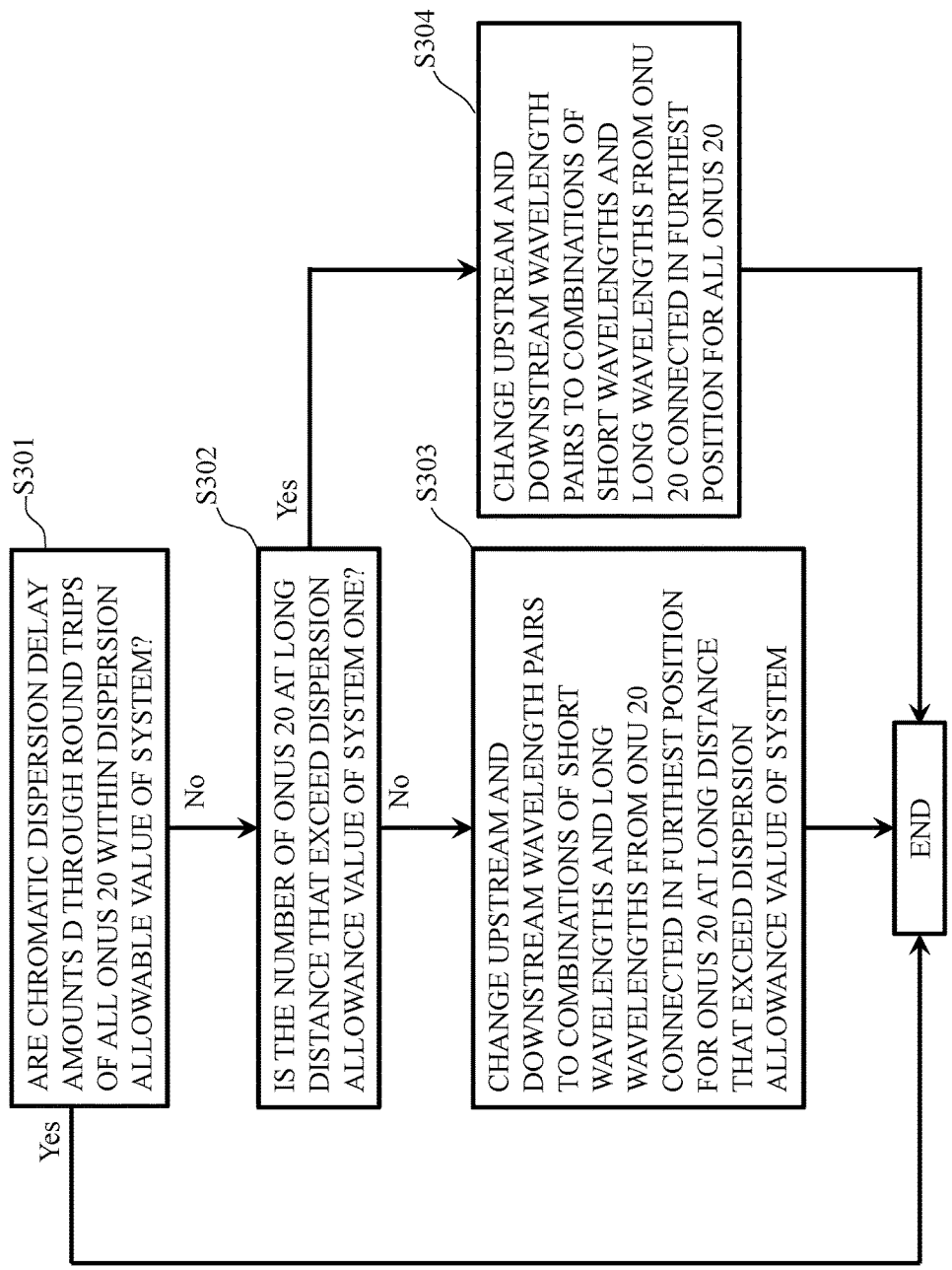
FIG. 14 shows an example of a wavelength pair changing flow in a wavelength multiplexing optical communication system according to a fifth embodiment of the present disclosure.

FIG. 14 shows a flowchart for changing wavelength pairs depending on the chromatic dispersion delay amounts D through round trips in the WDM/TDM-PON in which all the ONUs 20 are connected in different positions as shown in FIG. 2. In the present embodiment, as a premise, the default wavelength pairs of the upstream and downstream signals of the WDM/TDM-PON are also combined from the short wavelength side, as shown in FIG. 4.

In the present embodiment, if the connecting positions of all the ONUs 20, that is, the transmission distances L, can be grasped, the chromatic dispersion delay amounts D through round trips in all the ONUs 20 can also be uniquely calculated, as in the third embodiment and the fourth embodiment. As in the third embodiment and the fourth embodiment, this technique also utilizes the ranging functions in the PON system.

Therefore, in the present embodiment, a change of wavelength pairs is determined by deriving the chromatic dispersion delay amounts D through round trips of all the ONUs 20 on the basis of the connecting position information of the ONUs 20 identified by these ranging functions, and then comparing them with the predetermined dispersion allowable value of the system.

In the flow shown in FIG. 14, at step S301, in a case where the chromatic dispersion delay amounts D through the round trips of all the ONUs 20, which have been derived from the ranging, are within the dispersion allowable value of the system, the wavelength pairs are not changed. On the other hand, at step S301, in a case where the chromatic dispersion delay amount D through a round trip of at least one ONU 20 among the ONUs 20 connected in different positions exceeds the dispersion allowable value of the system, the process proceeds to step S302.

At step S302, in a case where there are two or more ONUs 20 whose chromatic dispersion delay amounts D through the round trips do not satisfy the dispersion allowable value of the system, the process proceeds to step S303. At step S303, the wavelength pairs are changed as in the first embodiment or the second embodiment among the wavelengths used by the ONUs 20 whose chromatic dispersion delay amounts D through the round trips exceed the dispersion allowable value of the system. On the other hand, at step S302, in a case where the number of ONUs 20 whose chromatic dispersion delay amounts D through the round trips exceed the dispersion allowable value of the system is one, the process proceeds to step S304, and as in the fourth embodiment, the wavelength pairs of all the ONUs 20 are changed as in the first embodiment or the second embodiment. Just by changing the combinations of the wavelength pairs, the present embodiment can mitigate the chromatic dispersion delay amounts D through round trips when the WDM/TDM-PON performs round trip communication. It is to be noted that the OLT according to the present embodiment may be connected to an external control device (not shown) and use wavelength pairs calculated by a technician via the control device, or the control device may calculate and input wavelength pairs into the OLT in advance.

In the third to fifth embodiments, the wavelength pairs used by all the ONUs 20 are changed such that the chromatic dispersion delay amounts D through the round trips fall within the dispersion allowable value of the system. Here, the flows of the third embodiment to the fifth embodiment may be repeated or the flows of the third embodiment to the fifth embodiment may be combined and used such that the chromatic dispersion delay amounts D through the round trips fall within the dispersion allowable value of the system. In addition, regardless of whether the chromatic dispersion delay amount D through a round trip exceeds the dispersion allowable value of the system, a wavelength pair used by at least one ONU 20 may be changed such that the sum or the average of the chromatic dispersion delay amounts D through the round trips of all the ONUs 20 becomes a minimum or a constant value, or may be changed such that the chromatic dispersion delay amounts D through the round trips of all the ONUs 20 fall within a certain range.

INDUSTRIAL APPLICABILITY

The station-side device according to the present disclosure is applicable to the communication industry.

REFERENCE SIGNS LIST

10 OLT
11 connecting building
20 ONU
30 optical splitter
40, 41, 42, 50 optical fiber transmission line

What is claimed is:

1. A station-side device for use for an optical communication system through which the station-side device and a plurality of subscriber-side devices connected via an optical transmission line perform, using wavelength division multiplexing, transmission of downstream signals from the station-side device to the subscriber-side devices and transmission of upstream signals from the subscriber-side devices to the station-side device, wherein the transmission of the upstream signals and the transmission of the downstream signals are performed using wavelength pairs in which wavelengths of the upstream signals included in an upstream signal wavelength band and wavelengths of the downstream signals included in a downstream signal wavelength band are paired for the respective subscriber-side devices, and as for the wavelength pairs, a maximum value of a chromatic dispersion delay amount of each wavelength pair, calculated by using a transmission distance between a subscriber-side device to which the wavelength pair is allocated and the station-side device, an upstream signal wavelength bandwidth showing an absolute value of a difference between a wavelength of an upstream signal of the wavelength pair and an upstream reference signal wavelength, an upstream signal chromatic dispersion amount showing a coefficient of variation of a chromatic dispersion amount estimated from a wavelength range of an upstream signal of the wavelength pair and the upstream reference signal wavelength, a downstream signal wavelength bandwidth showing an absolute value of a difference between a wavelength of a downstream signal of the wavelength pair and a downstream reference signal wavelength, and a downstream signal chromatic dispersion amount showing a coefficient of variation of a chromatic dispersion amount estimated from a wavelength range of a downstream signal of the wavelength pair and the downstream reference signal wavelength, is less than a chromatic dispersion delay amount of the wavelength pair calculated by using the transmission distance, the upstream signal wavelength bandwidth, the upstream signal chromatic dispersion amount, the downstream signal wavelength bandwidth, and the downstream signal chromatic dispersion amount, in a case where the upstream reference signal wavelength is set to a shortest wavelength included in the upstream signal wavelength band, the downstream reference signal wavelength is set to a shortest wavelength included in the downstream signal wavelength band, and a longest wavelength included in the upstream signal wavelength band and a longest wavelength included in the downstream signal wavelength band are set to the wavelength pair.

2. The station-side device according to claim 1,
wherein the wavelength pairs of the respective subscriber-side devices are allocated the wavelengths of the upstream signals in order from the short wavelength side and allocated the wavelengths of the downstream signals in order from the long wavelength side, or allocated the wavelengths of the upstream signals in order from the long wavelength side and allocated the wavelengths of the downstream signals in order from the short wavelength side.

3. The station-side device according to claim 1,
wherein in a case where a chromatic dispersion delay amount of the wavelength pair allocated to any of the subscriber-side devices among the plurality of subscriber-side devices, the chromatic dispersion delay amount being calculated using estimated chromatic dispersion amounts to be generated in the wavelength of the upstream signal and the wavelength of the downstream signal in the optical transmission line, exceeds a predetermined threshold value, the wavelength pair allocated to the subscriber-side device is changed.

4. The station-side device according to claim 1,
wherein in a case where a chromatic dispersion delay amount of the wavelength pair allocated to any of the subscriber-side devices among the plurality of subscriber-side devices, the chromatic dispersion delay amount being calculated using estimated chromatic dispersion amounts to be generated in the wavelength of the upstream signal and the wavelength of the downstream signal in the optical transmission line, exceeds a predetermined threshold value, all of the wavelength pairs allocated to the plurality of subscriber-side devices are changed.

5. The station-side device according to claim 1,
wherein in a case where two or more chromatic dispersion delay amounts of the wavelength pairs allocated to two or more subscriber-side devices among the plurality of subscriber-side devices, the chromatic dispersion delay amounts being calculated using estimated chromatic dispersion amounts to be generated in the wavelengths of the upstream signals and the wavelengths of the downstream signals in the optical transmission line, exceed a predetermined threshold value, the respective two or more wavelength pairs whose chromatic dispersion delay amounts exceed the threshold value are changed.

6. A wavelength control method of a station-side device in use for an optical communication system through which the station-side device and a plurality of subscriber-side devices connected via an optical transmission line perform, using a wavelength division multiplexing, transmission of downstream signals from the station-side device to the subscriber-side devices and transmission of upstream signals from the subscriber-side devices to the station-side device,
wherein the transmission of the upstream signals and the transmission of the downstream signals are performed using wavelength pairs in which wavelengths of the upstream signals included in an upstream signal wavelength band and wavelengths of the downstream signals included in a downstream signal wavelength band are paired for the respective subscriber-side devices, and
as for the wavelength pairs, a maximum value of a chromatic dispersion delay amount of each wavelength pair, calculated by using a transmission distance between a subscriber-side device to which the wavelength pair is allocated and the station-side device, an upstream signal wavelength bandwidth showing an absolute value of a difference between a wavelength of an upstream signal of the wavelength pair and an upstream reference signal wavelength, an upstream signal chromatic dispersion amount showing a coefficient of variation of a chromatic dispersion amount estimated from a wavelength range of an upstream signal of the wavelength pair and the upstream reference signal wavelength, a downstream signal wavelength bandwidth showing an absolute value of a difference between a wavelength of a downstream signal of the wavelength pair and a downstream reference signal wavelength, and a downstream signal chromatic dispersion amount showing a coefficient of variation of a chromatic dispersion amount estimated from a wavelength range of a downstream signal of the wavelength pair and the downstream reference signal wavelength, is less than a chromatic dispersion delay amount of the wavelength pair calculated by using the transmission distance, the upstream signal wavelength bandwidth, the upstream signal chromatic dispersion amount, the downstream signal wavelength bandwidth, and the downstream signal chromatic dispersion amount, in a case where the upstream reference signal wavelength is set to a shortest wavelength included in the upstream signal wavelength band, the downstream reference signal wavelength is set to a shortest wavelength included in the downstream signal wavelength band, and a longest wavelength included in the upstream signal wavelength band and a longest wavelength included in the downstream signal wavelength band are set to the wavelength pair.

7. The wavelength control method, according to claim 6, wherein in case of a distance between the station-side device and the subscriber-side devices whose chromatic dispersion delay amount exceeds a predetermined threshold value, the wavelength pairs allocated to the subscriber-side devices are changed.

8. The station-side device according to claim 2, wherein in a case where a chromatic dispersion delay amount of the wavelength pair allocated to any of the subscriber-side devices among the plurality of subscriber-side devices, the chromatic dispersion delay amount being calculated using estimated chromatic dispersion amounts to be generated in the wavelength of the upstream signal and the wavelength of the downstream signal in the optical transmission line, exceeds a predetermined threshold value, the wavelength pair allocated to the subscriber-side device is changed.

9. The station-side device according to claim 2, wherein in a case where a chromatic dispersion delay amount of the wavelength pair allocated to any of the subscriber-side devices among the plurality of subscriber-side devices, the chromatic dispersion delay amount being calculated using estimated chromatic dispersion amounts to be generated in the wavelength of the upstream signal and the wavelength of the downstream signal in the optical transmission line, exceeds a predetermined threshold value, all of the wavelength pairs allocated to the plurality of subscriber-side devices are changed.

10. The station-side device according to claim 2, wherein in a case where two or more chromatic dispersion delay amounts of the wavelength pairs allocated to two or more subscriber-side devices among the plurality of subscriber-side devices, the chromatic dispersion delay amounts being calculated using estimated chromatic dispersion amounts to be generated in the wavelengths of the upstream signals and the wavelengths of the downstream signals in the optical transmission line, exceed a predetermined threshold value, the respective two or more wavelength pairs whose chromatic dispersion delay amounts exceed the threshold value are changed.

* * * * *